(12) United States Patent
Friman (10) Patent No.: US 10,114,995 B2
(45) Date of Patent: Oct. 30, 2018

(54) METHOD AND ARRANGEMENTS FOR ESTIMATING ONE OR MORE DOMINATING ORIENTATIONS IN A DIGITAL IMAGE

(71) Applicant: SICK IVP AB, Linkoping (SE)

(72) Inventor: Ola Friman, Linkoping (SE)

(73) Assignee: SICK IVP AB, Linkoping (SE)

( * ) Notice: Subject to any disclaimer, the term of this patent is extended or adjusted under 35 U.S.C. 154(b) by 197 days.

(21) Appl. No.: 15/189,855

(22) Filed: Jun. 22, 2016

(65) Prior Publication Data

US 2016/0371844 A1 Dec. 22, 2016

(30) Foreign Application Priority Data

Jun. 22, 2015 (EP) ..................... 15173160

(51) Int. Cl.
*G06K 9/00* (2006.01)
*G06K 7/14* (2006.01)
(Continued)

(52) U.S. Cl.
CPC ......... *G06K 7/1417* (2013.01); *G06K 7/1456* (2013.01); *G06K 9/481* (2013.01);
(Continued)

(58) Field of Classification Search
CPC ........................................... G06T 2207/30204
See application file for complete search history.

(56) References Cited

U.S. PATENT DOCUMENTS 5,120,940 A 6/1992 Willsie
5,412,197 A 5/1995 Smith
(Continued)

FOREIGN PATENT DOCUMENTS

EP 2733644 5/2014
WO WO 9526010 9/1995

OTHER PUBLICATIONS

Huang et al., "Data Matrix Code Location Based on Finder Pattern Detection and Bar Code Border Fitting," Research Article, 2012, 13 pages.
(Continued)

*Primary Examiner* — Oneal R Mistry
(74) *Attorney, Agent, or Firm* — Fish & Richardson P.C.

(57) ABSTRACT

A method and arrangements for estimating one or more dominating orientations ($\alpha_{dom}$) in at least a part (201; 301) of a digital image (200; 300; 600). Representative angles ($\alpha_1 \ldots \alpha_N$) representing angles of gradient vectors ($g_1 \ldots g_N$) for pixels (1 ... N) of said at least part are obtained (401). It is further obtained (402) a target number (n) of dominating orientations. It is also obtained (404) a first sum (a) comprising added sine factors based on computed sines. The sines are computed for angles that correspond to said representative angles ($\alpha_1 \ldots \alpha_N$) multiplied with two times the target number (n). Further it is obtained (405) a second sum (b) comprising added cosine factors based on computed cosines for the same angles that said sine were computed for. Said one or more dominating orientations ($\alpha_{dom}$) are then estimated (406) based on the first sum (a), the second sum (b) and the target number (n).

21 Claims, 5 Drawing Sheets

(51) Int. Cl.
  *G06K 9/48* (2006.01)
  *G06K 9/52* (2006.01)
  *G06T 7/73* (2017.01)
  *G06T 7/77* (2017.01)

(52) U.S. Cl.
  CPC .............. *G06K 9/52* (2013.01); *G06T 7/73* (2017.01); *G06T 7/77* (2017.01); *G06T 2207/30204* (2013.01)

(56) References Cited

U.S. PATENT DOCUMENTS

| | | |
|---|---|---|
| 5,487,115 A | 1/1996 | Surka |
| 5,698,833 A | 12/1997 | Skinger |
| 5,742,041 A | 4/1998 | Liu |
| 6,088,482 A | 7/2000 | He et al. |
| 6,386,454 B2 | 5/2002 | Hecht et al. |
| 7,004,393 B2 | 2/2006 | Schum et al. |
| 7,172,124 B2 | 2/2007 | Wang et al. |
| 7,451,931 B2 | 11/2008 | Dant et al. |
| 7,780,084 B2 | 8/2010 | Zhang et al. |
| 7,876,933 B2 | 1/2011 | Jang et al. |
| 8,240,571 B2 | 8/2012 | Wu et al. |
| 8,608,073 B2 | 12/2013 | Baqai et al. |
| 2002/0084330 A1 | 7/2002 | Chiu |
| 2007/0104358 A1* | 5/2007 | Komatsu .............. G06K 9/4633 382/151 |
| 2009/0284775 A1 | 11/2009 | Muramatsu |
| 2010/0155464 A1* | 6/2010 | Swayn .................... G06K 7/14 235/375 |
| 2010/0200660 A1 | 8/2010 | Moed et al. |
| 2011/0303748 A1* | 12/2011 | Lemma ................ G06K 7/1417 235/454 |

OTHER PUBLICATIONS von Gioi et al., "LSD: A Fast Line Segment Detector wih a False Detection Control," IEEE Transactions on Pattern Analysis and Machine Intelligence, Apr. 2010, 32(4): 722-732.

* cited by examiner

METHOD AND ARRANGEMENTS FOR ESTIMATING ONE OR MORE DOMINATING ORIENTATIONS IN A DIGITAL IMAGE

CROSS REFERENCE TO RELATED APPLICATION

This application claims the benefit of European Application No. 15173160.1, filed Jun. 22, 2015. The disclosure of the prior application is considered part of and is incorporated by reference in the disclosure of this application.

TECHNICAL FIELD

Embodiments herein relate to a method and arrangements, e.g. a device, for estimating one or more dominating orientations in a digital image.

BACKGROUND

Information on orientations in digital images are of interest to obtain for various reasons. It may e.g. be of particular interest to be able to get information about dominating orientations in an automated way in order to use it in connection with machine vision, such as in automated inspection systems. Reasons may for example relate to reading and/or classification of codes, such as bar codes or so called smart codes. Based on knowledge of one or more dominating orientations in the an image depicting the code, a code reader and/or object can e.g. be positioned in a needed or improved position for reading the code, e.g. for more accurate and/or faster reading than else would be possible. Bar codes are examples of codes where information is coded in one or more directions, e.g. in one direction in 1-dimensional (1D) codes and in two directions in 2-dimensional (2D) codes. The most common conventional barcodes are 1D barcodes. So called smart codes, e.g. QUICK RESPONSE, or QR, codes are examples of 2D barcodes. There are also other codes that are based on that information is coded in one or more directions, or dimensions.

Not only codes have dominating directions of interest to obtain information about. In fact any label with information, such as text and/or other print typically have one or two dominating orientations. This is also true for in principle any object and image thereof, e.g. an image depicting a rectangular object typically has two dominating orientations orthogonal to the edges of the rectangular shape. Getting fast and accurate information of orientations may facilitate further handling, such as reading information on, griping and/or positioning of an object etc.

U.S. Pat. No. 7,876,933 B2 discloses methods and apparatuses for estimating orientation in an image, in particular with regard to a fingerprint image. The solution is based on measuring gradients and orientations of pixels, then quantize the measured orientations, corresponding to forming a histogram, and thereafter determine a representative, or dominating, orientation as an orientation having maximum histogram value in relation to quantized orientations.

SUMMARY

An object is to provide one or more improvements with regard to estimation of one or more dominating orientations in a digital image.

According to a first aspect of embodiments herein, the object is achieved by a method, that may be performed by a device, for estimating one or more dominating orientations in at least a part of a digital image. It is obtained representative angles representing angles of gradient vectors for pixels of said at least part of the digital image. It is further obtained a target number of dominating orientations. Moreover, it is obtained a first sum comprising added sine factors, the sine factors being based on computed sines. The sines are computed for angles that correspond to said representative angles multiplied with two times the target number. Furthermore, it is obtained a second sum comprising added cosine factors, the cosine factors being based on computed cosines. The cosines are computed for angles that correspond to said representative angles multiplied with two times the target number. Said one or more dominating orientations are then estimated based on the first sum, the second sum and the target number.

According to a second aspect of embodiments herein, the object is achieved by a computer program comprising instructions that when executed by a processing circuit causes said device to perform the method according to the first aspect.

According to a third aspect of embodiments herein, the object is achieved by a data carrier comprising the computer program according to the second aspect.

According to a fourth aspect of embodiments herein, the object is achieved by a device for estimating one or more dominating orientations in at least a part of a digital image. Said device is configured to obtain representative angles representing angles of gradient vectors for pixels of said at least part of the digital image. Said device is further configured to obtain a target number of dominating orientations. Moreover, the device is configured to obtain a first sum comprising added sine factors, the sine factors being based on computed sines. The sines are computed for angles that correspond to said representative angles multiplied with two times the target number. Furthermore, the device is configured to obtain a second sum comprising added cosine factors, the cosine factors being based on computed cosines. The cosines are computed for angles that correspond to said representative angles multiplied with two times the target number. The device is also configured to estimate said one or more dominating orientations based on the first sum, the second sum and the target number.

Information allowing for estimating said one or more dominating orientations are in said first and second sums and the target number, i.e. in three values relatively simple to obtain, while at the same time the method does not rely on and do not need quantization as conventionally typically is the case, e.g. when dominating orientations are estimated using histogram-based methods. Embodiments herein thus enable accurate estimation and facilitate implementation. The sums and estimation of the one or more dominating orientations enable use of, and they can be based on, calculations that allow for fast implementation in hardware, such as in a Field Programmable Gate Array (FPGA). At the same time the method enable high accuracy because no quantization is needed. Hence, embodiments herein provide improvement, or at least provide an alternative, with regard to estimation of one or more dominating orientations in a digital image.

BRIEF DESCRIPTION OF THE DRAWINGS

Examples of embodiments herein are described in more detail with reference to the appended schematic drawings, which are briefly described in the following.

FIG. 2b depicts a part, or sub-image, of the image of FIG. 2a.

FIG. 2c is a diagram showing a plot with gradient vectors for all pixels of the digital image in FIG. 2a.

FIG. 3b depicts a 2D barcode part of the 2D barcode image in FIG. 3a.

FIG. 6b shows a diagram similar to the diagram in FIG. 5b, but for the 1-dimensional structure in FIG. 6a.

DETAILED DESCRIPTION

Throughout the following description similar reference numerals have been used to denote similar elements, units, modules, circuits, parts, items or features, when applicable. In the figures, features that appear in some embodiments are typically indicated by dashed lines.

In order to facilitate understanding of embodiments herein, which are described further below, some examples and relations will first be discussed and explained.

Figure 1A:
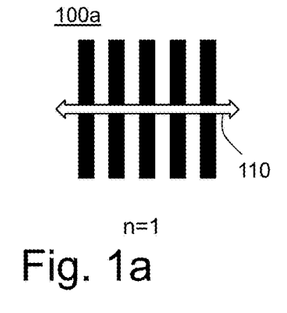
FIGS. 1a-c schematically illustrate three example images with different numbers of dominating orientations.
Figure 1B:
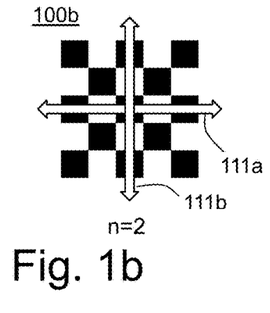
Figure 1C:
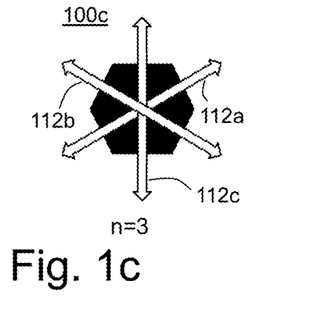

FIGS. 1a-c schematically illustrate three simplified example images respectively, described below, with different numbers of dominating orientations in order to explain the concept of dominating orientation. In the figures the number of dominating orientations per image is indicated by arrows and a number n, which differ for each image. Each arrow points in the two opposite directions that the dominating orientation in question is associated with.

In a first image 100a shown in FIG. 1a there is one dominating orientation 110a, indicated by an arrow and n=1.

In a second image 100b shown in FIG. 1b there are two dominating orientations 111a-b, indicted by arrows respectively and n=2. The two dominating orientations 201a-b are orthogonal to each other and symmetrically distributed.

In a third image 100c shown in FIG. 1c there are three symmetrically distributed dominating orientations 112a-c, indicated by arrows respectively and n=3.

Figure 2A:
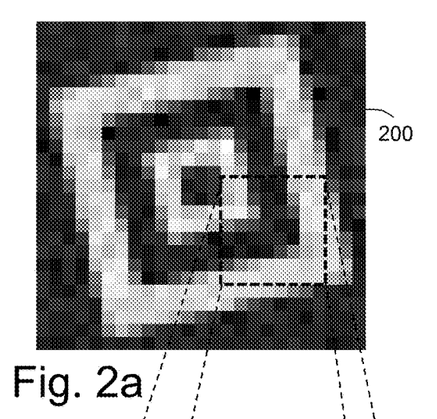
FIG. 2a depicts an example of a digital image that images an exemplary structure having two dominating orientations.

FIG. 2a depicts an example of a digital image 200 that images an exemplary structure having two dominating orientations, e.g. as in the case of a 2D barcode.

Figure 2B:
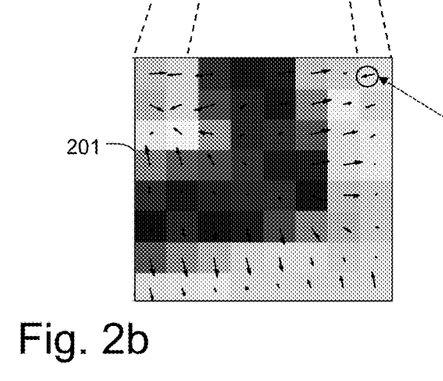

FIG. 2b depicts a part 201, or sub-image, of the digital image 200. There are two main orientations that can be found by e.g. analyzing the sub-image.

Note that images and parts thereof herein will be assumed to be in a digital domain, i.e. correspond to digital images and thus comprise pixels etc. as is well known to the skilled person. Analyzing the digital image 200 or the part 201 thereof will thus in practice relate to analyzing pixels, or rather pixel structures, of the digital image 200 and/or the part 201 thereof.

Obtaining knowledge about said orientations may be important for both classifying and reading a code, e.g. a 2D barcode.

The method according to embodiments herein, as will be described in detail below, may e.g. be applied to the entire digital image 200 or to one or more parts thereof, e.g. the part 201. The method use information from gradient vectors associated with pixels. In FIG. 2b are gradient vectors, in the form of small arrows, schematically illustrated for each pixel. A gradient of a pixel is a direction of intensity change for the pixel when taking neighboring pixels into account. A gradient vector associated with a pixel has a direction indicting the direction of intensity change and a magnitude value indicating the magnitude, or in other words the size, of the intensity change.

Figure 2C:
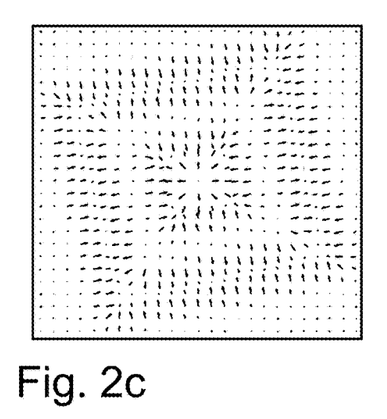

FIG. 2c is a diagram showing a plot with gradient vectors for all pixels of the digital image 200, i.e. of an image having two dominating directions. Each dot corresponds to a gradient vector $g_i$ of a pixel i, where i=1 . . . N with N being the total number of pixels of the digital image 200.

Figure 2D:
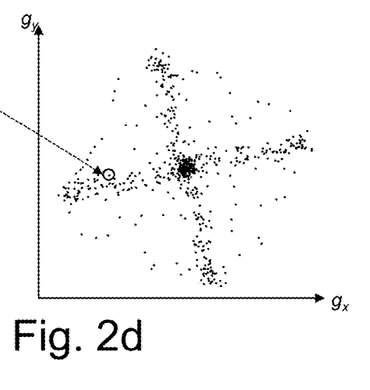
FIG. 2d is a diagram showing a plot of x- and y-gradients of the gradient vectors in FIG. 2c.

FIG. 2d is a diagram showing a plot of x- and y-gradients, $g_x$ and $g_y$, of the gradient vectors of FIG. 2c, i.e. for the pixels 1 . . . N of the digital image 200, i.e. an image having two dominating directions. Each dot, or point, corresponds to a gradient vector $g_i$ of a pixel i, where i=1 . . . N with N being the total number of pixels of the image 200. The gradient vector $g_i$ can be described by the x-gradient and y-gradient according to $g_i=(g_{x,i}, g_{y,i})$. The gradient vector $g_i$ has a magnitude $|g_i|$ and a direction and may be indicated by an arrow having a length corresponding to the magnitude $|g_i|$ and a direction that is indicated by a gradient angle $\alpha_i$. The direction of the gradient vector may thus be described as $g_{\alpha i}=(\cos \alpha_i, \sin \alpha_i)$. An exemplary arrow has been drawn between a dot in FIG. 2b and its gradient vector in the digital image 200 for illustrating the relationship. Note that the origin of coordinates in FIG. 2d is in the center of the image and that the $g_x$- and $g_y$-axis thus have been drawn with an offset in order not to obscure the dots and the pattern formed by the dots.

Gradient vectors may be obtained based on, e.g. calculated by using, any known method for image edge detection or gradient estimation, for example based on one or more of the following: a finite difference operator, a Sobel operator, a Prewitt operator, a Canny operator, a derivative-of-Gaussian operator, etc. The gradient angle may be computed according to $\alpha_i=\arctan(g_{y,i}, g_{x,i})$, i.e. using an arctangent function that provides a gradient angle in the interval $-\pi<\alpha_i\leq\pi$ expressed in radians.

Due to the dominating orientations in the digital image 200, the dots and gradient directions are clustered around the two dominating orientations. Note that each orientation is typically associated with two opposite directions, i.e. differing by 180 degrees or $\pi$ radians depending on angular representation used. It is clearly visible in the figure that the gradient vectors contain information about the dominating orientations.

Figure 3A:
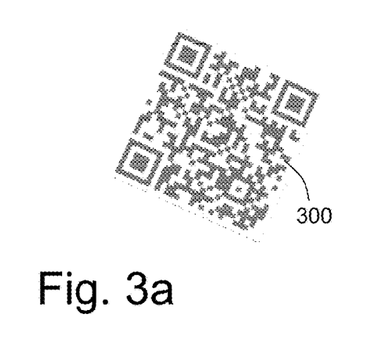
FIG. 3a depicts an example of a 2D barcode image.

FIG. 3a depicts an example of a 2D barcode image 300 that similarly to the digital image 200 have two dominating orientations.

Figure 3B:
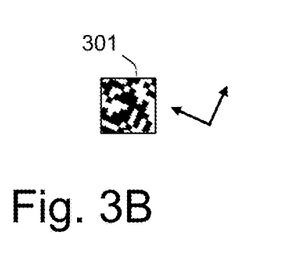

FIG. 3b depicts a 2D barcode part 301, or sub-image, of the 2D barcode image 300. The dominating orientations are present in and may be found from, e.g. by analyzing, the 2D barcode image 300 as a whole or from one or more parts thereof, e.g. from the 2D barcode part 301. Two arrows have been drawn to illustrate directions of the two dominating orientations in the 2D barcode part 301.

Corresponding gradient vectors etc. as discussed above in connection with FIGS. 2a-d may as well be obtained for the 2D barcode image and/or the 2D barcode part 201.

Figure 4:
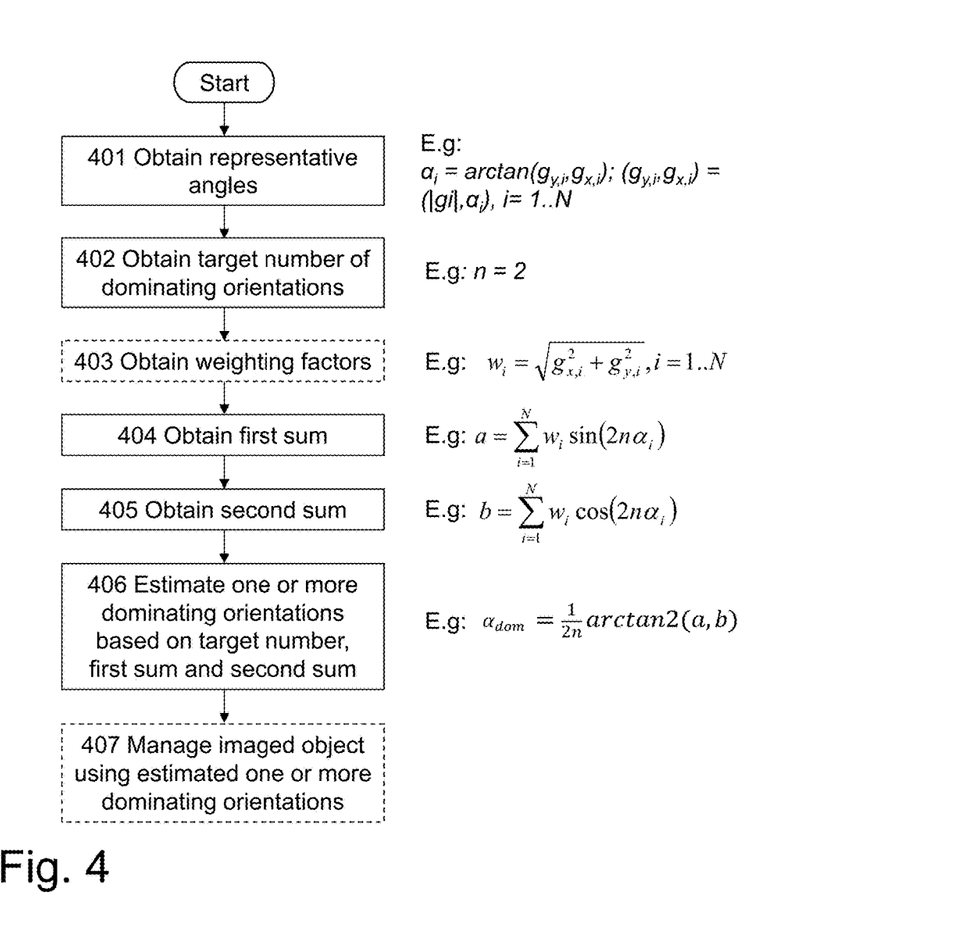
FIG. 4 is a flowchart schematically illustrating embodiments of a method.

FIG. 4 is a flowchart schematically illustrating embodiments of a method and will be used to discuss embodiments herein and related examples. The method is for estimating one or more dominating orientations, e.g. $\alpha_{dom}$, in at least a part of a digital image, e.g. the image 200, the 2D barcode image 300, the part 201 or the 2D barcode part 301. Hence, in some embodiments, said at least part of the digital image comprises an image of a digital code encoding information based on differences in contrast along one or more directions.

It should be noted that said at least part need not be of rectangular shape as in the case of e.g. the part 201, but may be of any or arbitrary shape. In fact said at least part may be many different and separated parts of an image, e.g. corresponding to a set of selected pixels of the image. Said at least part may e.g. be a tile of pixels in the magnitude of hundreds pixels, such as 24×24 pixels.

The method is typically performed by a single device, that will be further discussed below, but may as well be performed by a system with distributed parts performing different actions of the method.

As used herein and in the following, "obtain" may relate to obtain internally or externally in relation to the entity performing the action. The obtaining may be through or by another action, e.g. by computing or calculating, when applicable. Compute and calculate is used synonymously herein. However, the obtaining may as well be accomplished by receiving or retrieving what is obtained from another entity than performing the action, e.g. another device, unit, system, other part of a system, or the like. Such other entity may in turn previously have computed or calculated what is obtained.

The method comprises the following actions, which actions may be taken in any suitable order and/or be carried out fully or partly overlapping in time when this is possible and suitable.

Action 401

Obtain, e.g. compute, representative angles representing angles of gradient vectors for pixels of said part. The representative angles may be denoted $\alpha_i$, with i=1 . . . N, or $\alpha_1$ . . . $\alpha_N$, where N is the number of pixels.

Advantageously the representative angles $\alpha_1$ . . . $\alpha_N$ correspond to angles of the gradient vectors, e.g. $g_i$ of individual pixels i, for i=1 . . . N. In other words, each representative angle $\alpha_i$ may be the gradient angle of a gradient vector $g_i$. That is, in this case the representative angles $\alpha_1$ . . . $\alpha_N$ are not quantized as conventionally typically is the case. Thanks to this the method e.g. enable improved accuracy compared to methods where quantization is used and/or that fewer pixels may need to be used, e.g. selected out as the part 201 of the image 200, thereby also improved executional speed is enabled. The pixels of said at least part may correspond to a collection of N pixels.

In some embodiments other angles as representative angles, e.g. based on quantization, may nevertheless be used. For example, a total angular interval for the gradient vectors, $-\pi < \alpha_i \leq \pi$. may be divided into a number of sub-intervals, each corresponding to a so called bin, and it may then be determined to what sub-interval, or bin, each pixel belongs based on its gradient vector. This corresponds to forming a histogram. Each sub-interval is associated with a representative angle, e.g. the mid angle of the sub-interval. The number of pixels associated with each such sub-interval determines its significance and may correspond to assigning weighting factors, as explained below, to the sub-intervals.

In case of quantization, the pixels of said part may correspond to a collection of M pixels, where M>N, i.e. each representative angle $\alpha_i$ may be based on gradient vectors for more than one pixel.

Reasons for using representative angles that are quantized, i.e. based on quantization, may be when/if this enable more efficient or simplified computations on a selected or given hardware, and that a histogram enables compact representation of the representative angles for all pixels.

Hence the method is flexible and can be used on in principle any type of representing angle of gradient vectors. In case representative angles based on quantization are used, it should be considered if and to what extent additional and/or other processing that the quantization requires may counteract benefits enabled by the method, such as fast execution and improved accuracy, and if this is acceptable.

Action 402

Obtain a target number, herein denoted n, of dominating orientations.

This is thus an integer number that may be predetermined, e.g. pre-set to a certain number. Typically the target number is based on pre-knowledge of the number of dominating orientations that are to be estimated. As will be realized from the below, the target number should be at least the number of dominating orientations to be estimated. A greater number can be used for finding lower number of dominating orientations but not the opposite. The method will find no more than the target number of dominating orientations. Normally the number of orientations is known, e.g. if is known to be a 1D code or 2D code which orientations are to be estimated. At least for estimating one or two dominating orientations, in particular for the case of 1D and 2D codes, it has been found that the method enables a target number of 2, i.e. n=2, to be advantageously used for both cases.

In the case of n>1 and depending on the result, e.g. if one dominating orientation found is much more significant and/or dominating than the other, it can be determined whether one or more less dominate orientations shall be ignored or not. In case of codes there can be a classification performed to determine the type of code, e.g. 1D or 2D. In the former case the most dominating orientation may then be used to estimate the orientation of the code. Hence, the target number n may be pre-set or predetermined to be a number that will encompass the largest number of dominate orientations that is known to be present, or desirable to estimate, in a certain implementation and/or use case of the method.

Action 403

Weighting factors, e.g. $w_1$ . . . $w_N$, associated with the representative angles $\alpha_1$ . . . $\alpha_N$ may be obtained, e.g. computed.

The weighting factors $w_1$ . . . $w_N$ may be considered to directly or indirectly relate to the magnitude of the gradient vectors $g_i, \ldots g_N$.

The weighting factors $w_1$ . . . $w_N$ may advantageously be based on the size, e.g. magnitude, of the gradient vectors, i.e. here $g_i$, for the pixels i of said at least part of the digital image, where i=1 . . . N. This enable accurate weighting based on calculation using values from the gradient vectors $g_i$ . . . $g_N$. The calculations may in practice be performed in a number of various ways. For example, the calculation may be based on one or more of the following expressions:

$$w_i = g_{x,i}^2 + g_{y,i}^2 \quad (\text{exp 1})$$

$$w_i = \sqrt{g_{x,i}^2 + g_{y,i}^2} \quad (\text{exp 2})$$

$$w_i = |g_{x,i}| + |g_{y,i}| \quad (\text{exp 3})$$

$$w_i = \begin{cases} 1, & \text{if } g_{x,i}^2 + g_{y,i}^2 > \tau \\ 0, & \text{otherwise} \end{cases} \quad (\text{exp 4})$$

where $w_i$ denotes a weighting factor for a pixel i, and $\tau$ is a threshold value that may be predetermined and/or set so that some pixels i with gradients vectors $g_i$ that have too small size are not used in the estimation.

In some embodiments, weighting factors may additionally and/or alternatively be related to the pixel's position in the image or part thereof, for example the distance from the pixel to the center of the image or part thereof. The further away, the lesser the importance.

In some embodiments, weighting factors are not used, e.g. in embodiments where the representative angle is based on quantization into bins or similar, as discussed above.

Action 404

Obtain, e.g. compute, a first sum, herein denominated a, comprising added sine factors. The sine factors are based on computed sines, which sines are computed for angles that correspond to said representative angles $\alpha_1 \ldots \alpha_N$ multiplied with two times the target number. That is, each representative angle $\alpha_i$, for i=1 ... N, is multiplied with 2n, and then sine is computed for the resulting angle.

The sine factors may be further based on the weighting factors $w_1 \ldots w_N$ obtained in Action 403, where each computed sine that the sine factors are based on is multiplied with a weighting factor $w_i$ associated with the same representative angle $\alpha_i$ that the sine was computed for.

The first sum may correspond to and may be computed according to:

$$a = \sum_{i=1}^{N} w_i \sin(2n\alpha_i), \quad (\text{exp 5})$$

where i, N, $w_i$, n and $\alpha_i$ may be as explained above.

Action 405

Obtain, e.g. compute, a second sum, herein denominated b, comprising added cosine factors. The cosine factors are based on computed cosines, which cosines are computed for angles that correspond to said representative angles $\alpha_1 \ldots \alpha_N$ multiplied with two times the target number, i.e. 2n.

The cosine factors may be further based on the obtained weighting factors $w_1 \ldots w_N$ in Action 403, where each computed cosine that the cosine factors are based on is multiplied with a weighting factor $w_i$ associated with the same representative angle $\alpha_i$ that the cosine was computed for.

The second sum may correspond to and may be computed according to:

$$b = \sum_{i=1}^{N} w_i \cos(2n\alpha_i), \quad (\text{exp 6})$$

where i, N, $w_i$, n and $\alpha_i$ may be as explained above.

Action 406

Estimate, typically by computation, said one or more dominating orientations, e.g. $\alpha_{dom}$, based on the first sum a, the second sum b and the target number n. Information allowing for estimating one or more dominating orientations may be considered comprised in said three values, each being relatively simple to obtain, while at the same time, as mentioned above, quantization is not needed. Embodiments herein thus enable accurate estimation and facilitate implementation.

A first dominating orientation of the estimated one or more dominating orientations may be based on computed arctangent for a ratio between the first sum a and the second sum b, divided by two times the target number n. For example, the first dominating orientation of the estimated one or more dominating orientations may be found using an arctangent function of a and b. In a preferred embodiment, the so-called arctan 2-function is used, also known as the four-quadrant arctangent function or the signed arctangent function, which may be defined as:

$$\arctan2(a, b) = \begin{cases} \arctan\left(\frac{a}{b}\right) & b > 0 \\ \arctan\left(\frac{a}{b}\right) + \pi & a \geq 0, b < 0 \\ \arctan\left(\frac{a}{b}\right) - \pi & a < 0, b < 0 \\ \pi/2 & a > 0, b = 0 \\ -\pi/2 & a < 0, b = 0 \\ \text{not defined} & a = 0, b = 0 \end{cases} \quad (\text{exp 7})$$

A first dominating orientation of the estimated one or more dominating orientations may thus be calculated as and/or correspond to:

$$\alpha_{dom} = \frac{1}{2n}\arctan2(a, b), \quad (\text{exp 8})$$

where a, b and n may be as explained above, i.e. n is said target number, a is the first sum and b is the second sum. As should be recognized, a vector with direction according to the first dominating orientation may then easily be obtained according to:

$$v = \begin{pmatrix} \cos(\alpha_{dom}) \\ \sin(\alpha_{dom}) \end{pmatrix} \quad (\text{exp 9})$$

Any further dominating one or more orientations may obtained from said first orientation and symmetrical distribution of the dominating orientations. In case of multiple dominating orientations, the method may be considered based on that it is known and/or on assumption that the multiple dominating orientations are symmetrically distributed.

Action 407

An object that is imaged by said at least part of the digital image, e.g. the digital image 200, the part 201 thereof, the 2D barcode image 300 or the 2D barcode part 301, may be managed using the estimated one or more orientations, e.g. $\alpha_{dom}$. For example, a digital code, such as the 2D barcode of the 2D barcode image 300, may be read using the one or more estimated orientations, such as by scanning and reading the code along the estimated dominating orientation(s).

It should be noted that although the method described above and/or actions thereof may be considered based on and/or be described using special functions, including trigonometric functions, such as sine, cosine, arctangent and square-root, which e.g. may be denominated sin( ), cos( ), arctan( ) and sqrt( ) respectively, these can be avoided, e.g. by numerical approximations of the mathematical functions and/or using mathematical identities. Expressions that do not involve trigonometric functions are e.g. possible to obtain, which may be better suited for fast implementation and execution on certain processing circuits. For example, as should be recognized by the skilled person, the mathematical expressions in e.g. any one of expressions exp 5-8 may be rewritten in other equivalent forms using known mathematical identities.

Avoiding using special functions may for example also be accomplished using well-known techniques such as pre-computed look-up tables or the so called Coordinate Rotation Digital Computer (CORDIC) algorithm.

In general, whether to avoid special functions and/or trigonometric functions, or not, if this required, beneficial and to what extent, may depend on computational hardware used for implementing the method.

The sums and estimation of the one or more dominating orientations as described above for embodiments herein are relatively simple and can be implemented using calculations that allow for fast implementation, as should be recognized by the skilled person. At the same time they allow for high accuracy since quantization, as explained above, is not necessary. Embodiments herein may e.g. be implemented based on calculations that allow for fast implementation in hardware, such as in a Field-Programmable Gate Array (FPGA). Embodiments herein thereby enable implementation that is fast and accurate in estimation of dominating orientation(s) and that can enable faster and/or more accurate such estimation than conventionally is the case. Hence, embodiments herein provide improvements, or at least an alternative, with regard to estimation of one or more dominating orientations in a digital image.

Figure 5A:
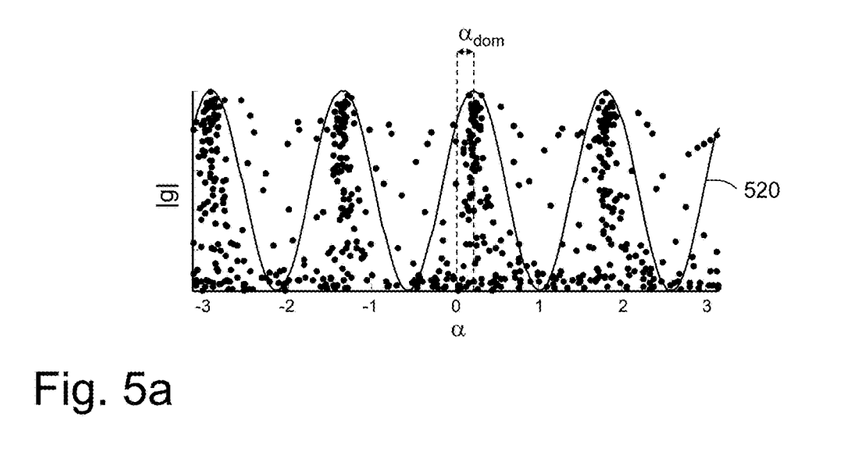
FIG. 5a is is a diagram showing a plot of x- and y-gradients for pixels of a digital image having two dominating orientations and a sinusoidal curve with a phase shift corresponding to a dominating orientation.

FIG. 5a is is a diagram showing a plot of x- and y-gradients for pixels of a digital image, e.g. a digital image corresponding to the image 100, having two dominating orientations. Each pixel gradient is represented by a dot, or point, in the plot in polar coordinates $g_i=(\alpha_i, |g_i|)$, using the gradient angle and the gradient magnitude as described above. A sinusoidal curve 520, shown in the figure, with form $\cos(2n\alpha-\varphi)$ may approximate the pixel gradient points, where the phase shift angle $\varphi$ may correspond to a dominating orientation. The phase shift angle $\varphi$ may be calculated using the known mathematical identity $$\cos(2n\alpha-\varphi) \sim a\sin(2n\alpha-\varphi)+b\cos(2n\alpha-\varphi), \quad (\text{exp } 10)$$

where '~' means proportional to, or up to a scaling factor which is irrelevant in the current application, and with a and b as above, see e.g. expressions exp 5 and exp 6. The shown sinusoidal curve 520 is with n=2, i.e. for targeting said two dominating orientations. According to the mathematical identity in expression exp 9, the phase shift angle $\varphi$ may be calculated as the arctangent function of a and b, e.g. $\varphi=\arctan 2(a,b)$.

A first dominating orientation angle $\alpha_{dom}$ may be found where the sinusoid $\cos(2n\alpha-\varphi)$ has its first maximum value, i.e., the first dominating orientation angle $\alpha_{dom}$ may be found as described above according to expression exp 8, that is:

$$\alpha_{dom} = \frac{1}{2n}\varphi = \frac{1}{2n}\arctan 2(a, b) \quad (\text{exp } 11)$$

Figure 5B:
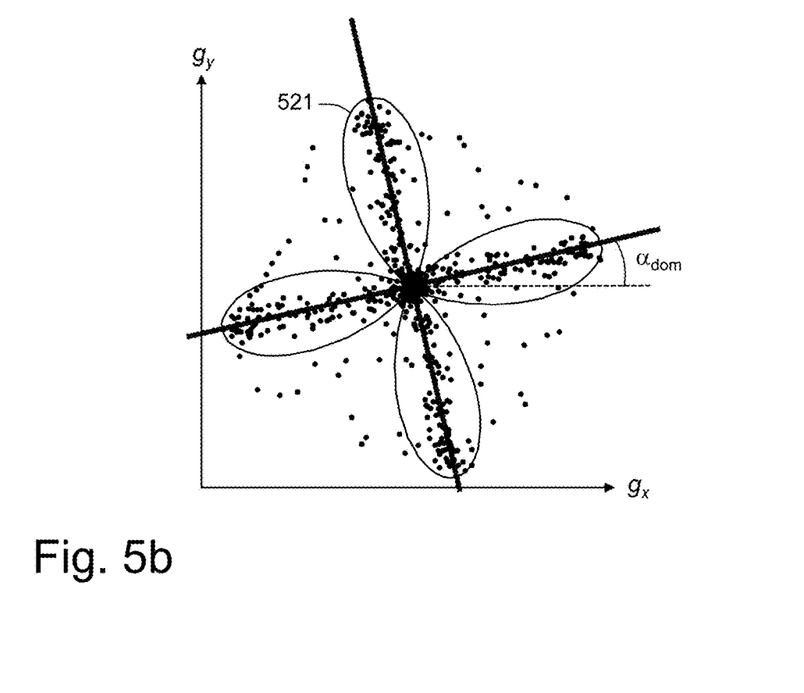
FIG. 5b is is a diagram corresponding to the diagram in FIG. 5a, but with each pixel gradient instead represented by a point in Cartesian coordinates and with a sinusoidal curve drawn in polar coordinates.

FIG. 5b is is a diagram corresponding to the diagram in FIG. 5a, but with each pixel gradient instead represented by a point in a cartesian coordinate system $g_i=(g_{x,i}, g_{y,i})$. The sinusoidal curve 521 is equivalent to the sinusoidal curve 520 in FIG. 5a, but drawn in polar coordinates instead. It is seen that the first maximum of the sinusoidal curve 520 corresponds to the first dominating orientation angle $\alpha_{dom}$.

Figure 6A:
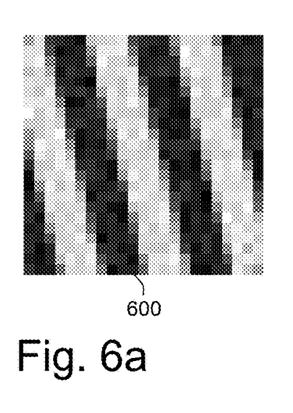
FIG. 6a shows an image with a 1-dimensional oriented structure.

FIG. 6a shows an image 600 with a 1-dimensional oriented structure, with one dominating orientation. The image 600 may e.g. depict a part of a 1D barcode.

Figure 6B:
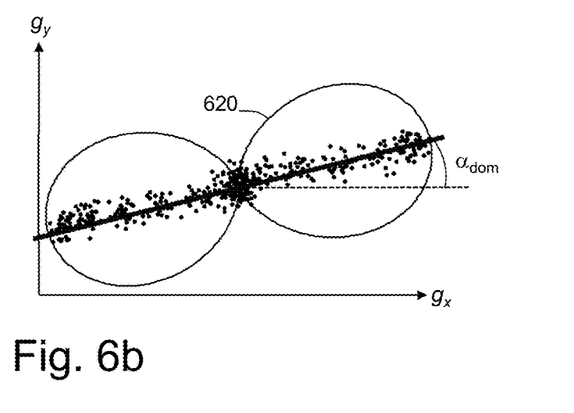

FIG. 6b shows a diagram similar to the diagram in FIG. 5b, but for the 1-dimensional structure in FIG. 6a instead. A sinusoidal curve 620 and a first dominating orientation angle $\alpha_{dom}$, both shown in the figure, may be found equivalently as described above, but with n=1.

Figure 7:
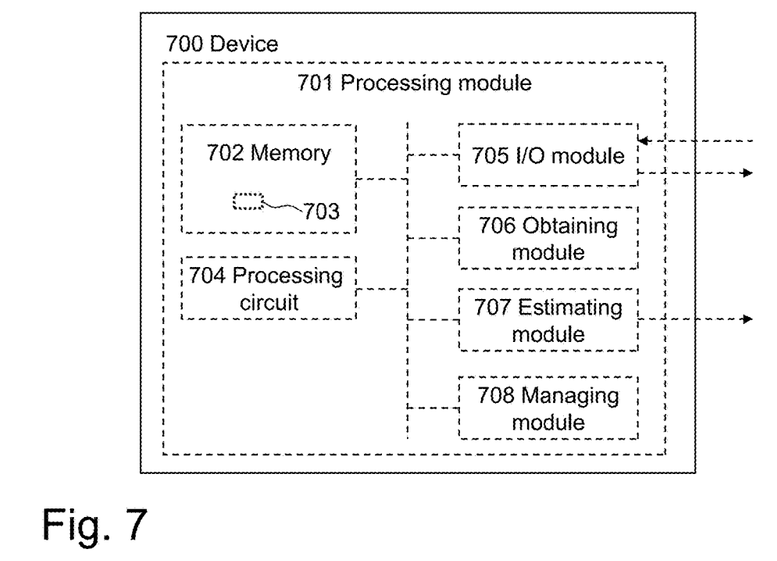
FIG. 7 is a functional block diagram for illustrating embodiments of a device.

FIG. 7 is a schematic block diagram for illustrating embodiments of a device 700 for estimating one or more dominating orientations in at least a part of a digital image, e.g. the part 201 of the digital image 200. The device 700 may e.g. be one or more of the following as applicable: a digital electronic circuit, an image sensor circuit, an electronic chip, a computer, an Application Specific Integrated Circuit (ASIC), a Field Programmable Gate Array (FPGA), a Graphical Processing Unit (GPU), an Accelerated Processing Unit (ACU), a Digital Signal Processor (DSP). The figure is particularly for illustrating how the device 700 may be configured to perform the method and actions discussed above in connection with FIG. 4.

The device 700 may comprise a processing module 701, such as a means, one or more hardware modules, including e.g. one or more processors, and/or one or more software modules for performing said methods and/or actions.

The device 700 may further comprise a memory 702 that may comprise, such as contain or store, a computer program 703. The computer program comprises 'instructions' or 'code' directly or indirectly executable by the device 700 so that it performs said methods and/or actions. The memory 702 may comprise one or more memory units and may be further be arranged to store data, such as configurations and/or applications involved in or for performing functions and actions of embodiments herein.

Moreover, the device 700 may comprise a processing circuit 704 as an exemplifying hardware module and may comprise or correspond to one or more processors. In some embodiments, the processing module 701 may comprise, e.g. 'is embodied in the form of' or 'realized by' the processing circuit 704. In these embodiments, the memory 702 may comprise the computer program 703 executable by the processing circuit 704, whereby the device 700 is operative, or configured, to perform said method and/or actions.

Typically the device 700, e.g. the processing module 901, comprises an Input/Output (I/O) module 705, configured to be involved in, e.g. by performing, any communication to and/or from other device, units and/or the like, such as sending and/or receiving information to and/or from external devices. The I/O module 705 may be exemplified by an obtaining, e.g. receiving, module and/or a providing, e.g. sending, module, when applicable.

In further embodiments, the device 700, e.g. the processing module 701, may comprise one or more of an obtaining module 706, an estimating module 707 and a managing module 708, as exemplifying hardware and/or software module(s). In some embodiments, the obtaining module 706, the estimating module 707 and the managing module 708 may be fully or partly implemented by the processing circuit 704.

Therefore, according to the various embodiments described above, the device 700, and/or the processing module 701 and/or the obtaining module 706, are operative, or configured, to, obtain said target number of dominating orientations, obtain said first sum and obtain said second sum. Further, according to the various embodiments described above, the device 700, and/or the processing module 701 and/or the obtaining module 706 may be operative, or configured, to, obtain said weighting factors.

Moreover, according to the various embodiments described above, the device 700, and/or the processing module 701 and/or the estimating module 707 are operative, or configured, to estimate said one or more dominating directions based on the first sum, the second sum and the target number.

Furthermore, according to the various embodiments described above, the device 700, and/or the processing module 701 and/or the managing module 708 may be operative, or configured, to, manage an object imaged by said at least part of the digital image using the estimated one or more orientations.

Figure 8A:
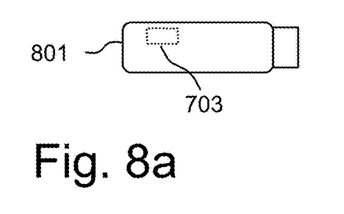
FIGS. 8a-c are schematic drawings illustrating embodiments relating to computer program products and computer programs to cause the device to perform method actions.
Figure 8B:
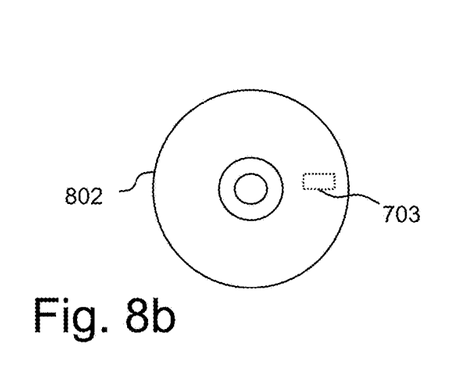
Figure 8C:
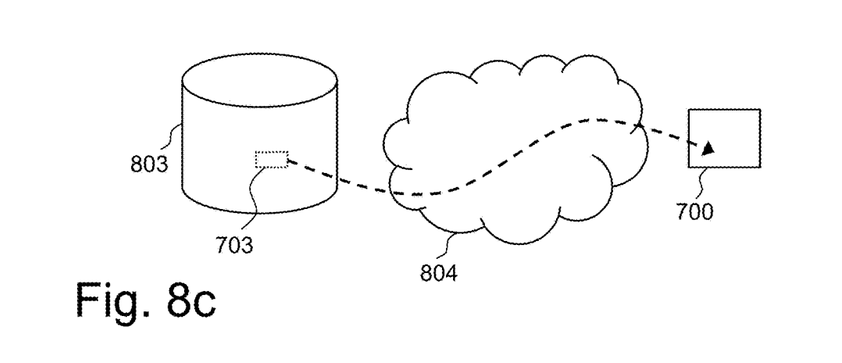

FIGS. 8a-c are schematic drawings illustrating embodiments relating to the computer program 703 that comprises instructions that when executed by the processing circuits 704 and/or the processing module 701, causes the device 700 to perform as described above.

In some embodiments there is provided a data carrier, e.g. a computer program product, comprising the computer program 703. The data carrier may be one of an electronic signal, an optical signal, a radio signal, and a computer readable medium. The computer program 703 may thus be stored on the computer readable medium. By data carrier may be excluded a transitory, propagating signal and the data carrier may correspondingly be named non-transitory data carrier. Non-limiting examples of the data carrier being a computer-readable medium is a memory card or a memory stick 801 as in FIG. 8a, a disc storage medium 802 such as a CD or DVD as in FIG. 8b, a mass storage device 803 as in FIG. 8c. The mass storage device 803 may be based on hard drive(s) or Solid State Drive(s) (SSD). The mass storage device 803 may be such that is used for storing data accessible over a computer network 804, e.g. the Internet or a Local Area Network (LAN).

The computer programs 803 may furthermore be provided as a pure computer program or comprised in a file or files. The file or files may be stored on the computer-readable medium and e.g. available through download e.g. over the computer network 804, such as from the mass storage device 803 via a server. The server may e.g. be a web or File Transfer Protocol (FTP) server. The file or files may e.g. be executable files for direct or indirect download to and execution on device 700, e.g. by the processing circuit 704. The file or files may also or alternatively be for intermediate download and compilation involving the same or another processor to make them executable before further download and execution causing the device 700 to perform the method(s) as described above.

Note that any processing module(s) mentioned in the foregoing may be implemented as a software and/or hardware module, e.g. in existing hardware and/or as an Application Specific integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the device 700 to be configured to and/or to perform the above-described methods, respectively.

Note that embodiments herein are not limited to only such context(s) as used in the examples.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that enumerating terminology of objects and features, such as first object, second object, and similar, as such should be considering non-limiting and that this kind of terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method for scanning bar codes oriented at angles by estimating dominating orientations of the bar codes and reading the bar codes along the dominating orientations, wherein the method comprises:

scanning, with an image sensor circuit of a code reader, a barcode image on an object, analyzing, by the code reader, pixels (1 . . . N) of the barcode image to compute gradient vectors ($g_1 \ldots g_N$) that identify, for each respective pixel, a direction of intensity change and a magnitude of intensity change for the respective pixel in comparison to neighboring pixels, computing, by the code reader, representative angles ($\alpha_1 \ldots \alpha_N$) that represent respective representing angles of the gradient vectors ($g_1 \ldots g_N$) that were computed for the pixels of the barcode image, obtaining, by the code reader, a target number (n) of dominating orientations of the barcode image, obtaining, by the code reader, a first sum (a) comprising added sine factors, the sine factors being based on computed sines, which sines are computed for angles that correspond to said representative angles ($\alpha_1 \ldots \alpha_N$) multiplied with two times the target number (n) of dominating orientations of the barcode image, obtaining, by the code reader, a second sum (b) comprising added cosine factors, the cosine factors being based on computed cosines, which cosines are computed for angles that correspond to said representative angles ($\alpha_1 \ldots \alpha_N$) multiplied with two times the target number (n) of dominating orientations of the barcode image, estimating, by the code reader, one or more dominating orientations ($\alpha_{dom}$) of the barcode image based on the first sum (a), the second sum (b), and the target number (n) of dominating orientations of the barcode image, and reading, by the code reader in response to the code reader having estimated the one or more dominating orientations ($\alpha_{dom}$) of the barcode image, the barcode image along the one or more dominating orientations ($\alpha_{dom}$) of the barcode image.

2. The method of claim 1, wherein a first dominating orientation ($\alpha_{dom}$) of the estimated one or more dominating orientations ($\alpha_{dom}$) is based on computed arctangent for a ratio between the first sum (a) and the second sum (b), divided by two times the target number (n), wherein any further dominating one or more orientations are obtained from said first dominating orientation ($\alpha_{dom}$) and symmetrical distribution of the dominating orientations.

3. The method of claim 1, wherein the representative angles ($\alpha_1 \ldots \alpha_N$) correspond to angles of the gradient vectors ($g_1 \ldots g_N$) of individual pixels (1 ... N).

4. The method of claim 1, wherein the method further comprises:

obtaining weighting factors ($w_1 \ldots w_N$) associated with the representative angles ($\alpha_1 \ldots \alpha_N$), and wherein the sine and cosine factors are further based on the obtained weighting factors ($w_1 \ldots w_N$), where each of said computed sine and cosine that the sine and cosine factors are based on is multiplied with a weighting factor ($w_i$) associated with the same representative angle ($\alpha_i$) that the sine and cosine were computed for.

5. The method of claim 4, wherein the weighting factors ($w_1 \ldots w_N$) are based on the size of the gradient vectors ($g_1 \ldots g_N$) for the pixels (N) of said at least a part of the barcode image.

6. The method of claim 1, wherein said at least part of the barcode image comprises an image of a digital code encoding information based on differences in contrast along one or more directions.

7. The method of claim 1, wherein the method further comprises:

managing an object imaged by said at least part of the barcode image using the estimated one or more dominating orientations ($\alpha_{dom}$).

8. A code reader for scanning bar codes oriented at angles by estimating dominating orientations of the bar codes and reading the bar codes along the dominating orientations, wherein said code reader is configured to:

scan, with an image sensor circuit of the code reader, a barcode image on an object, analyze, by the code reader, pixels (1 ... N) of the barcode image to compute gradient vectors ($g_1 \ldots g_N$) that identify, for each respective pixel, a direction of intensity change and a magnitude of intensity change for the respective pixel in comparison to neighboring pixels, compute, by the code reader, representative angles ($\alpha_1 \ldots \alpha_N$) that represent respective angles of the gradient vectors ($g_1 \ldots g_N$) that were computed for the pixels of the barcode image, obtain, by the code reader, a target number (n) of dominating orientations of the barcode image, obtain, by the code reader, a first sum (a) comprising added sine factors, the sine factors being based on computed sines, which sines are computed for angles that correspond to said representative angles ($\alpha_1 \ldots \alpha_N$) multiplied with two times the target number (n) of dominating orientations of the barcode image, obtain, by the code reader, a second sum (b) comprising added cosine factors, the cosine factors being based on computed cosines, which cosines are computed for angles that correspond to said representative angles ($\alpha_1 \ldots \alpha_N$) multiplied with two times the target number (n) of dominating orientations of the barcode image, estimate, by the said one or more dominating orientations ($\alpha_{dom}$) based on the first sum (a), the second sum (b) and the target number (n), and read, by the code reader in response to the code reader having estimated the one or more dominating orientations ($\alpha_{dom}$) of the barcode image, the barcode image along the one or more dominating orientations ($\alpha_{dom}$) of the barcode image.

9. The device of claim 8, wherein a first dominating orientation ($\alpha_{dom}$) of the estimated one or more dominating orientations ($\alpha_{dom}$) is based on computed arctangent for a ratio between the first sum (a) and the second sum (b), divided by two times the target number (n), wherein any further dominating one or more orientations are obtained from said first dominating orientation ($\alpha_{dom}$) and symmetrical distribution of the dominating orientations.

10. The device of claim 8, wherein the representative angles ($\alpha_1 \ldots \alpha_N$) correspond to angles of the gradient vectors of individual pixels.

11. The device of claim 8, wherein the device is further configured to:

obtain weighting factors ($w_1 \ldots w_N$) associated with the representative angles ($\alpha_1 \ldots \alpha_N$), and wherein the sine and cosine factors are further based on the obtained weighting factors ($w_1 \ldots w_N$), where each of said computed sine and cosine that the sine and cosine factors are based on is multiplied with a weighting factor ($w_i$) associated with the same representative angle ($\alpha_i$) that the sine and cosine were computed for.

12. The device of claim 11, wherein the weighting factors ($w_1 \ldots w_N$) are based on the size of the gradient vectors ($g_1 \ldots g_N$) for the pixels (N) of said at least a part of the barcode image.

13. The device of claim 8, wherein said at least a part of the barcode image comprises an image of a digital code encoding information based on differences in contrast along one or more directions.

14. The device of claim 8, wherein the device is further configured to:

manage an object imaged by said at least part of the barcode image using the estimated one or more dominating orientations ($\alpha_{dom}$).

15. A non-transitory, computer-readable storage medium encoded with computer program instructions that, when executed cause at least one processor to perform operations comprising:

scanning, with an image sensor circuit of a code reader, a barcode image on an object, analyzing, by the code reader, pixels (1 . . . N) of the barcode image to compute gradient vectors ($g_1 \ldots g_N$) that identify, for each respective pixel, a direction of intensity change and a magnitude of intensity change for the respective pixel in comparison to neighboring pixels, computing, by the code reader, representative angles ($\alpha_1 \ldots \alpha_N$) that represent respective angles of the gradient vectors ($g_1 \ldots g_N$) that were computed for the pixels of the barcode image, obtaining, by the code reader, a target number (n) of dominating orientations of the barcode image, obtaining, by the code reader, a first sum (a) comprising added sine factors, the sine factors being based on computed sines, which sines are computed for angles that correspond to said representative angles ($\alpha_1 \ldots \alpha_N$) multiplied with two times the target number (n) of dominating orientations of the barcode image, obtaining, by the code reader, a second sum (b) comprising added cosine factors, the cosine factors being based on computed cosines, which cosines are computed for angles that correspond to said representative angles ($\alpha_1 \ldots \alpha_N$) multiplied with two times the target number (n) of dominating orientations of the barcode image, estimating, by the code reader, one or more dominating orientations ($\alpha_{dom}$) of the barcode image based on the first sum (a), the second sum (b), and the target number (n) of dominating orientations of the barcode image, and reading, by the code reader in response to the code reader having estimated the one or more dominating orientations ($\alpha_{dom}$) of the barcode image, the barcode image along the one or more dominating orientations ($\alpha_{dom}$) of the barcode image.

16. The computer-readable storage medium of claim 15, wherein a first dominating orientation ($\alpha_{dom}$) of the estimated one or more dominating orientations ($\alpha_{dom}$) is based on computed arctangent for a ratio between the first sum (a) and the second sum (b), divided by two times the target number (n), wherein any further dominating one or more orientations are obtained from said first dominating orientation ($\alpha_{dom}$) and symmetrical distribution of the dominating orientations.

17. The computer-readable storage medium of claim 15, wherein the representative angles ($\alpha_1 \ldots \alpha_N$) correspond to angles of the gradient vectors ($g_1 \ldots g_N$) of individual pixels (1 . . . N).

18. The computer-readable storage medium of claim 15, wherein the operations further comprise:

obtaining weighting factors ($w_1 \ldots w_N$) associated with the representative angles ($\alpha_1 \ldots \alpha_N$), and wherein the sine and cosine factors are further based on the obtained weighting factors ($w_1 \ldots w_N$), where each of said computed sine and cosine that the sine and cosine factors are based on is multiplied with a weighting factor ($w_i$) associated with the same representative angle ($\alpha_i$) that the sine and cosine were computed for.

19. The computer-readable storage medium of claim 18, wherein the weighting factors ($w_1 \ldots w_N$) are based on the size of the gradient vectors ($g_1 \ldots g_N$) for the pixels (N) of said at least a part of the barcode image.

20. The computer-readable storage medium of claim 15, wherein said at least part of the barcode image comprises an image of a digital code encoding information based on differences in contrast along one or more directions.

21. The computer-readable storage medium of claim 15, wherein the operations further comprise:

managing an object imaged by said at least part of the barcode image using the estimated one or more dominating orientations ($\alpha_{dom}$).

\* \* \* \* \*

UNITED STATES PATENT AND TRADEMARK OFFICE
CERTIFICATE OF CORRECTION

PATENT NO. : 10,114,995 B2
APPLICATION NO. : 15/189855
DATED : October 30, 2018
INVENTOR(S) : Ola Friman It is certified that error appears in the above-identified patent and that said Letters Patent is hereby corrected as shown below:

In the Claims

At Column 12, Line 65 (Claim 1, Line 13), after "respective", delete "representing".

Signed and Sealed this
Twenty-ninth Day of January, 2019

Andrei Iancu
*Director of the United States Patent and Trademark Office*